US012559982B2

(12) United States Patent
Tang

(10) Patent No.: US 12,559,982 B2
(45) Date of Patent: Feb. 24, 2026

(54) DOOR LOCK DEVICE AND ANTI-THEFT DOOR

(71) Applicant: BEIJING XIAOMI MOBILE SOFTWARE CO., LTD., Beijing (CN)

(72) Inventor: Jianyu Tang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 258 days.

(21) Appl. No.: 17/875,369

(22) Filed: Jul. 27, 2022

(65) Prior Publication Data

US 2023/0313566 A1 Oct. 5, 2023

(30) Foreign Application Priority Data

Mar. 30, 2022 (CN) ......................... 202210333703.0

(51) Int. Cl.

*E05B 49/00* (2006.01)
*E05B 9/00* (2006.01)
*E05B 9/08* (2006.01)

(52) U.S. Cl.

CPC ................ *E05B 49/00* (2013.01); *E05B 9/08* (2013.01); *E05B 9/002* (2013.01)

(58) Field of Classification Search

CPC ...... E05B 9/002; E05B 9/08; E05B 2035/009; E05B 1/0015; E05B 1/04; E05B 63/0056; E05B 63/04; E05B 63/0043; E05B 2009/004; E05B 17/0012; E05B 17/14; E06B 3/36; E06B 3/06; E06B 5/11; Y10T 292/57

USPC ............................................................ 70/146

See application file for complete search history.

(56) References Cited

U.S. PATENT DOCUMENTS

| | | | | |
|---|---|---|---|---|
| 6,412,317 | B1 * | 7/2002 | Martin | E05B 9/08 70/451 |
| 7,023,319 | B2 * | 4/2006 | Hwang | G07C 9/00944 341/20 |
| 7,389,661 | B2 * | 6/2008 | Viviano | E05B 63/0017 70/381 |
| 8,079,240 | B2 * | 12/2011 | Brown | E05B 63/0056 70/279.1 |
| 8,307,515 | B2 * | 11/2012 | Ramsauer | E05B 1/0015 16/415 |

(Continued)

FOREIGN PATENT DOCUMENTS

| | | | |
|---|---|---|---|
| CN | 101523004 A | 9/2009 | |
| CN | 106837004 A * | 6/2017 | E05B 63/04 |

(Continued)

OTHER PUBLICATIONS

CN 111502412 Espacenet machine translation description and claims (Year: 2024).*

(Continued)

*Primary Examiner* — Steven A Tullia

(74) *Attorney, Agent, or Firm* — Arch & Lake LLP; Hao Tan; Shen Wang

(57) ABSTRACT

A door lock device is provided. The door lock device includes a panel and a mounting base. The panel is arranged opposite to the mounting base and is connected with the mounting base. The mounting base includes a recess located in a middle of one side of the mounting base and on a first surface of the mounting base close to the panel, and the recess and the panel form a handle structure.

18 Claims, 8 Drawing Sheets

(56) References Cited

U.S. PATENT DOCUMENTS

| | | | | |
|---|---|---|---|---|
| 8,579,346 | B2 * | 11/2013 | Schaefer | E05B 79/06 296/1.08 |
| 9,963,907 | B2 * | 5/2018 | Jeong | E05B 9/08 |
| 10,767,392 | B2 * | 9/2020 | Aguirrezabala Olasagasti | E05B 9/08 |
| 2019/0292811 | A1 * | 9/2019 | Bolognesi | E05B 9/082 |
| 2023/0145985 | A1 * | 5/2023 | Kremmel | A47L 15/4257 16/412 |

FOREIGN PATENT DOCUMENTS

| | | | | | |
|---|---|---|---|---|---|
| CN | 107965212 | A | * | 4/2018 | E05B 13/002 |
| CN | 108086792 | A | * | 5/2018 | E05B 15/00 |
| CN | 207620511 | U | * | 7/2018 | E05B 3/00 |
| CN | 207686414 | U | * | 8/2018 | E05B 1/00 |
| CN | 207714928 | U | * | 8/2018 | E05B 49/00 |
| CN | 207794805 | U | * | 8/2018 | E05B 15/00 |
| CN | 207794851 | U | * | 8/2018 | E05B 13/002 |
| CN | 108505842 | A | * | 9/2018 | E05B 63/0004 |
| CN | 108518128 | A | * | 9/2018 | E05B 15/0013 |
| CN | 108625671 | A | * | 10/2018 | E05B 9/002 |
| CN | 207960172 | U | * | 10/2018 | E05B 49/00 |
| CN | 109184329 | A | * | 1/2019 | E05B 49/00 |
| CN | 109339582 | A | * | 2/2019 | E05B 17/00 |
| CN | 109356448 | A | | 2/2019 | |
| CN | 209131227 | U | * | 7/2019 | E06B 7/28 |
| CN | 110130738 | A | * | 8/2019 | E05B 47/0012 |
| CN | 110371030 | A | * | 10/2019 | B60R 13/013 |
| CN | 110485826 | A | * | 11/2019 | E05B 9/002 |
| CN | 110499966 | A | * | 11/2019 | E05B 3/00 |
| CN | 210195460 | U | | 3/2020 | |
| CN | 111173368 | A | * | 5/2020 | E05B 15/00 |
| CN | 111173370 | A | * | 5/2020 | E05B 47/00 |
| CN | 111299972 | A | * | 6/2020 | B23P 15/00 |
| CN | 111502412 | A | | 8/2020 | |
| CN | 211448143 | U | * | 9/2020 | |
| CN | 111764759 | A | * | 10/2020 | E05B 17/186 |
| CN | 111852188 | A | * | 10/2020 | E05B 9/00 |
| CN | 112854904 | A | | 5/2021 | |
| CN | 213269310 | U | * | 5/2021 | E05B 47/00 |
| CN | 214124411 | U | | 9/2021 | |
| CN | 113482442 | A | * | 10/2021 | E05B 9/08 |
| CN | 215671551 | U | | 1/2022 | |
| CN | 215761017 | U | * | 2/2022 | E05B 47/00 |
| CN | 217080019 | U | | 7/2022 | |
| DE | 4117199 | A1 | * | 5/1991 | E05B 13/10 |
| DE | 202006005648 | U1 | * | 7/2006 | A47B 95/02 |
| DE | 202007014576 | U1 | * | 1/2008 | E05B 1/0038 |
| DE | 202008015847 | U1 | * | 5/2010 | E05B 65/462 |
| DE | 202012101452 | U1 | * | 10/2012 | E05B 1/0092 |
| DE | 102015216808 | A1 | * | 3/2017 | E05C 9/1858 |
| DE | 102019202171 | A1 | | 9/2019 | |
| EP | 0482355 | A1 | | 4/1992 | |
| EP | 1528190 | A1 | * | 5/2005 | E05B 1/0015 |
| EP | 2735675 | A2 | * | 5/2014 | E05B 1/0092 |
| EP | 3626919 | A1 | * | 3/2020 | E05B 15/02 |
| EP | 3458660 | B1 | * | 7/2020 | E05B 47/0038 |
| EP | 4206422 | B1 | * | 1/2024 | E05B 13/10 |
| ES | 2303669 | T3 | * | 8/2008 | E05B 1/0092 |
| FR | 2811696 | A1 | * | 1/2002 | E05B 15/0046 |
| FR | 2847289 | A1 | * | 5/2004 | E05B 63/04 |
| GB | 2429746 | A | * | 3/2007 | E05B 63/04 |
| GB | 2522975 | A | * | 8/2015 | E05B 1/003 |
| JP | H10280741 | A | * | 3/1997 | E05B 1/00 |
| JP | 2006299746 | A | * | 11/2006 | E05B 1/06 |
| JP | 2015078586 | A | * | 4/2015 | E05B 1/06 |
| KR | 200312770 | Y1 | * | 2/2003 | E05B 17/226 |
| KR | 20090009046 | U | * | 3/2008 | E05B 9/08 |
| KR | 20100049791 | A | * | 11/2008 | A47B 95/02 |
| KR | 20120081265 | A | * | 1/2011 | E05B 9/08 |
| KR | 101154433 | B1 | * | 11/2011 | E05B 9/08 |
| KR | 101183670 | B1 | * | 6/2012 | E05B 9/08 |
| KR | 101279872 | B1 | * | 3/2013 | E05B 9/08 |
| KR | 20160111064 | A | * | 3/2015 | E05B 1/0015 |
| KR | 101735241 | B1 | * | 5/2016 | E05B 1/0069 |
| KR | 1020160111064 | A | | 9/2016 | |
| KR | 101693368 | B1 | | 1/2017 | |
| KR | 200491994 | Y1 | * | 5/2020 | E05B 37/0044 |
| KR | 20210123972 | A | * | 6/2020 | E05B 63/0056 |
| KR | 1020200078447 | A | | 7/2020 | |
| WO | WO-2019091100 | A1 | * | 5/2019 | E05B 15/00 |
| WO | WO-2021167451 | A1 | * | 8/2021 | E05B 1/0015 |

OTHER PUBLICATIONS

Extended European Search Report issued in Application No. 22187594.1, dated Dec. 22, 2022,(6p).

Chinese Patent Office, Office Action issue in Application No. 202210333703.0 dated on Jan. 26, 2024 with English translation. (12P).

First search report issue in Application No. 2022103337030 dated on Jan. 25, 2024.(3P).

European Office Action of EP Application No. 22187594.1 dated Mar. 19, 2025, (5p).

* cited by examiner

DOOR LOCK DEVICE AND ANTI-THEFT DOOR

CROSS REFERENCE TO RELATED APPLICATION

The present application claims the benefit of priority to Chinese Application No. 202210333703.0, filed on Mar. 30, 2022, the contents of which are incorporated herein by reference in their entireties for all purposes.

BACKGROUND

A door lock device is an important part of the anti-theft door, which can facilitate the opening and closing of the anti-theft door.

SUMMARY

The disclosure relates to the field of anti-theft doors, in particular to a door lock device and an anti-theft door.

According to a first aspect of the disclosure, a door lock device is provided and includes a panel and a mounting base. The panel is arranged opposite to the mounting base and is connected with the mounting base. The mounting base includes a recess, the recess is located in a middle of one side of the mounting base and on a first surface of the mounting base close to the panel, the recess and the panel form a handle structure.

According to a second aspect of the disclosure, an anti-theft door is provided and includes a door sheet and a door lock device. The door lock device includes a panel and a mounting base. The panel is arranged opposite to the mounting base and is connected with the mounting base. The mounting base includes a recess, the recess is located in a middle of one side of the mounting base and on a first surface of the mounting base close to the panel, the recess and the panel form a handle structure. A second surface that is away from the panel, of the mounting base of the door lock device is connected with the door sheet.

BRIEF DESCRIPTION OF THE DRAWINGS

In order to describe the technical solutions in the examples of the disclosure more clearly, the accompanying drawings required for describing the examples are briefly described below. Obviously, the accompanying drawings in the following description show merely some examples of the disclosure, and a person of ordinary skill in the art would also be able to derive other accompanying drawings from these accompanying drawings without creative efforts.

DETAILED DESCRIPTION

In order to make the objectives, technical solutions and advantages of the disclosure clearer, the examples of the disclosure will be further described in detail below with reference to the accompanying drawings.

Unless otherwise defined, technical terms or scientific terms used in the disclosure should have the ordinary meanings understood by those of ordinary skill in the art to which the disclosure belongs. "First", "second", "third" and other similar words used in the description and the claims of the disclosure do not indicate any order, quantity or importance, but are merely used to distinguish between different components. Similarly, "one", "a/an" or other similar words do not denote a limitation of quantity, but denote the presence of at least one. "Comprise", "include" or other similar words mean that an element or object appearing before the word "comprise" or "include" encompasses elements or objects listed after the word "comprise" or "include" and their equivalents, without excluding other elements or objects. "Connect", "connected" or other similar words are not limited to physical or mechanical connections, but may include electrical connections, whether direct or indirect. "Up", "down", "left", "right", etc. are merely used to indicate relative position relations, and when the absolute position of an object described changes, the relative position may change accordingly.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

To open or close the anti-theft door, a user needs to pull or push the door lock device with a hand to move the door. In the related art, it is arbitrary to push or pull a door lock device of an anti-theft door with a left hand or by a right hand.

In an instance of a left-handed door, if a user pulls a door lock device with the right hand to open the door, after the anti-theft door is opened, the left hand will be far away from the crack, which is safe. If the user pulls the door lock device with the left hand to open the door, after the anti-theft door is opened a crack, the right side of the user will be close to the crack. In this case, if the right hand touches the door frame accidentally, it might be pinched by the anti-theft door and the door frame, especially for young children.

Examples of the disclosure provide a door lock device and an anti-theft door, which may reduce possibility that a hand is pinched.

Figure 1:
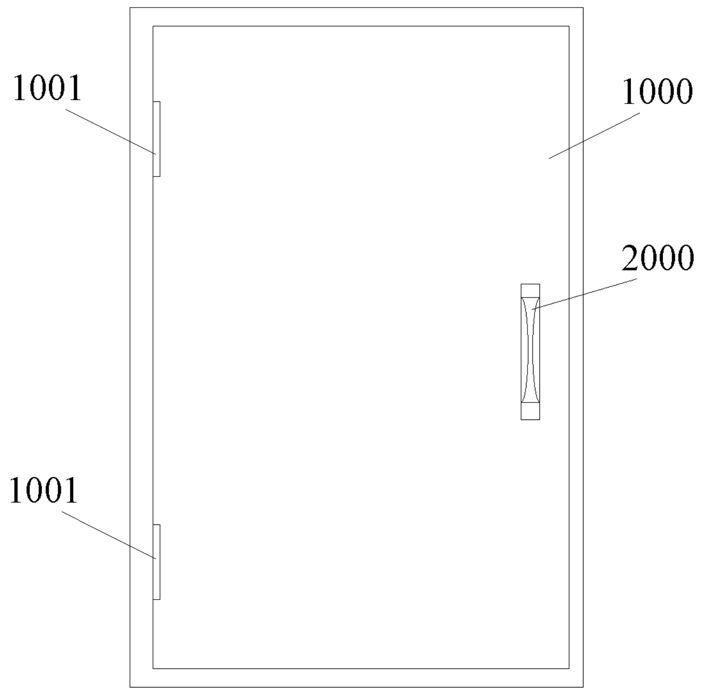
FIG. 1 is a schematic structural diagram of an anti-theft door in the related art.

FIG. 1 is a schematic structural diagram of an anti-theft door in the related art. As shown in FIG. 1, the anti-theft door is a left-handed door and includes a door sheet 1000 and a door lock device 2000. The door lock device 2000 is connected with the door sheet 1000. One side of the door sheet 1000 is hinged to a door frame by means of a hinge, and the door lock device 2000 is close to the other side of the door sheet 1000 away from the hinge. When opening and closing the anti-theft door, a user may hold the door lock device 2000 from a left side of the door lock device 2000 with a left hand, and may hold the door lock device 2000 from a right side of the door lock device 2000 with a right hand. Under the situation that the user holds the door lock device 2000 with the left hand to open and close the anti-theft door, a crack between the door sheet 1000 and the door frame is located on a right side of the anti-theft door. In this case, if the user accidentally touches the door frame with the right hand, there is a risk that the right hand may be pinched. Especially for children having less arm strength, children are used to touching the door frame with one hand when the door is opened or closed, such that a risk of being pinched is higher.

Figure 2:
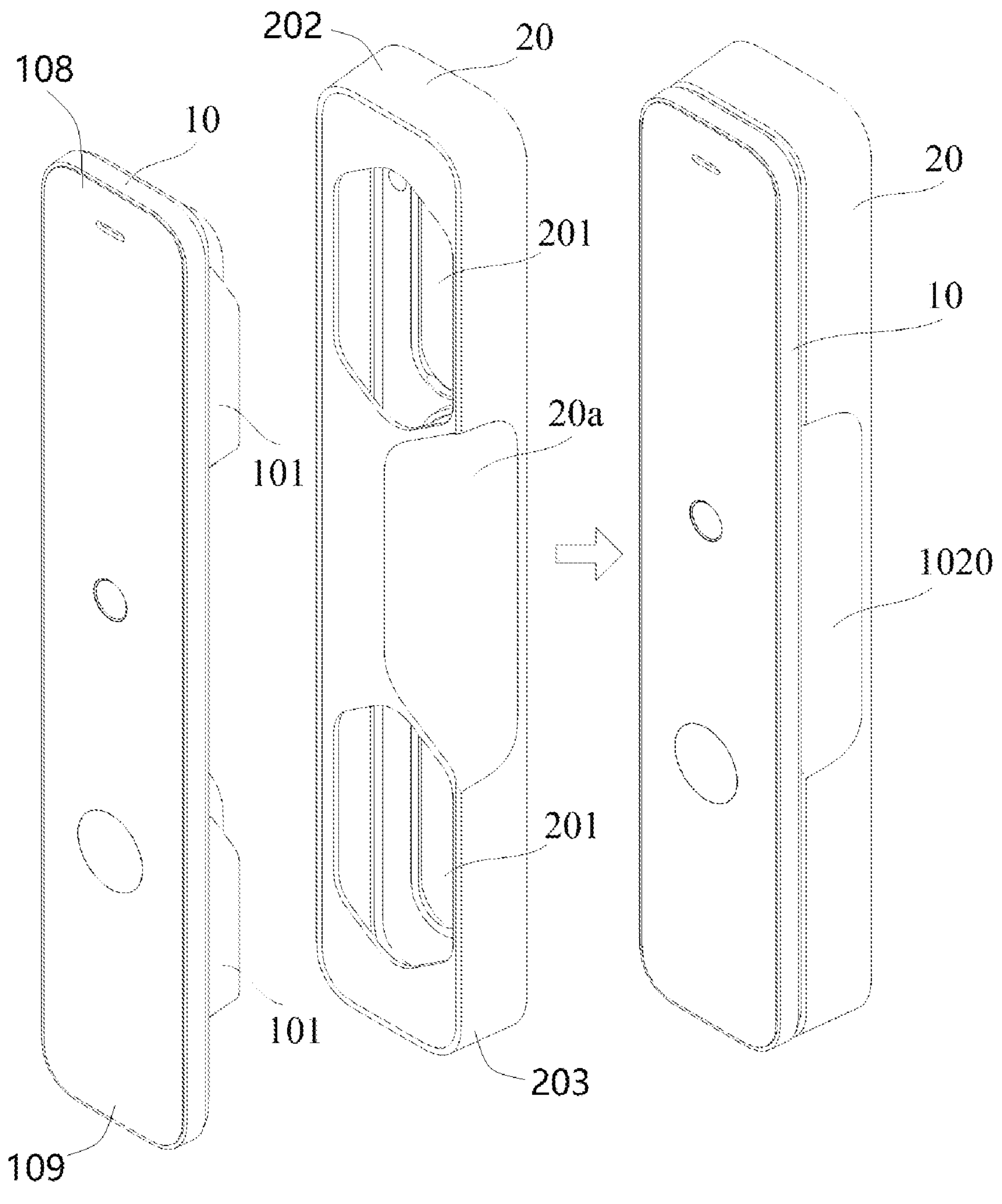
FIG. 2 is a schematic structural diagram of a door lock device provided in an example of the disclosure.

FIG. 2 is a schematic structural diagram of a door lock device provided in an example of the disclosure. As shown in FIG. 2, the door lock device includes a panel 10 and a mounting base 20.

The panel 10 is arranged opposite the mounting base 20, and the panel 10 is connected with the mounting base 20.

The mounting base 20 has a recess 20*a*, the recess 20*a* is located in a middle of one side of the mounting base 20 and on a first surface of the mounting base 20 close to the panel 10, and the recess 20*a* and the panel 10 form a handle structure 1020.

The panel 10 is arranged opposite to the mounting base 20 and connected with the mounting base 20, the recess 20*a* is provided in the middle of one side of the mounting base 20 and on the first surface of the mounting base 20 close to the panel 10, the recess 20*a* and the panel 10 form the handle structure 1020, and the handle structure 1020 is set for a user to push and pull the door lock device. Since the recess 20*a* is located on one side of the mounting base 20, the user may only open and close the door with a hand put into the handle structure 1020 from the side where the recess 20*a* is located, so as to guide the user to use the hand on the side where the recess 20*a* is located to operate and reduce the risk of being pinched by the anti-theft door and a door frame.

The panel 10 has a first end 108 and a second end 109 in a length direction of the panel 10, and the mounting base 20 has a first end 202 and a second end 203 in a length direction of the mounting base 20.

As shown in FIG. 2, a front surface of the panel 10, that is, a surface, away from the mounting base 20, of the panel 10 is rectangular. A display screen, keys, a camera, a loudspeaker and other structures may be arranged on the front surface of the panel 10. The length direction of the panel 10 is a length direction of the front surface of the panel 10, and a width direction of the panel 10 is a width direction of the front surface of the panel 10. The length direction and a width direction of the mounting base 20 are the same as those of the panel 10, respectively.

Figure 3:
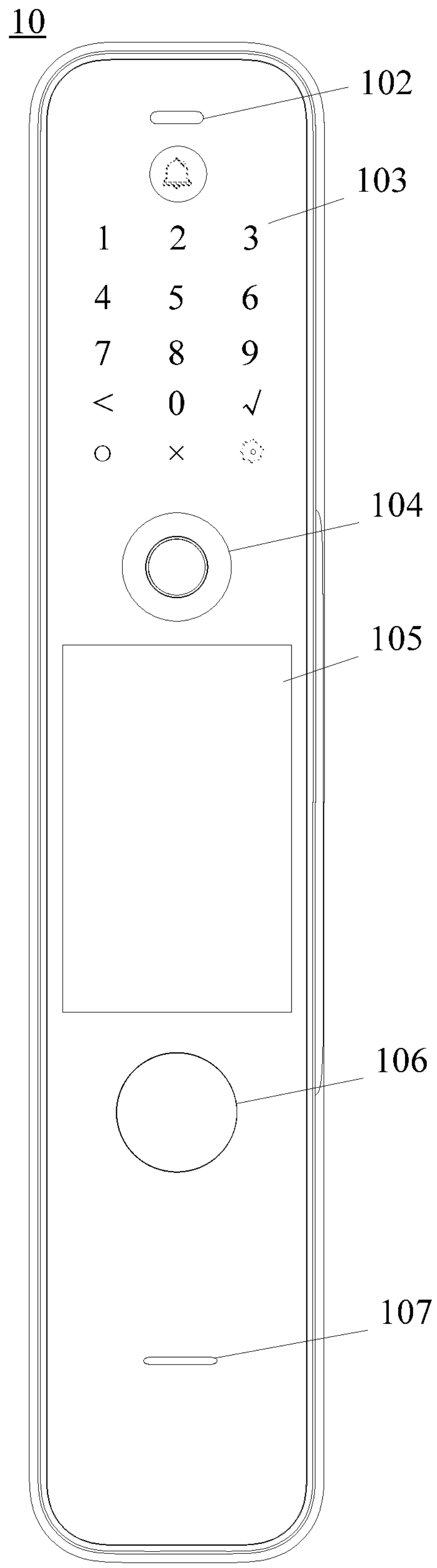
FIG. 3 is a front view of a panel provided in an example of the disclosure.

FIG. 3 is a front view of a panel provided in an example of the disclosure. As shown in FIG. 3, a loudspeaker 102, a plurality of keys 103, a camera 104, a display screen 105, a fingerprint sensor 106 and a microphone 107 are arranged on the front surface of the panel 10. The keys 103 may be physical keys or virtual keys, such as touch keys. Under the situation that the keys 103 are touch keys, the keys 103 and the display screen 105 may be as a whole, that is, the display screen 105 may be a touch display screen.

A layout of the loudspeaker 102, the plurality of keys 103, the camera 104, the display screen 105, the fingerprint sensor 106 and the microphone 107 on the front surface of the panel 10 in FIG. 3 is merely an example. In other examples, only part of the loudspeaker 102, the plurality of keys 103, the camera 104, the display screen 105, the fingerprint sensor 106 and the microphone 107 may be arranged on the front surface of the panel 10, or other structures, such as a sensor for reading information of identity card, may be further arranged.

In some examples, the panel 10 may be detachably connected with the mounting base 20, and the panel 10 may be connected with the mounting base 20 in a first connection mode or a second connection mode.

In a situation that the panel 10 is connected with the mounting base 20 in the first connection mode, the first end 108 of the panel 10 is opposite to the first end 202 of the mounting base 20, and the second end 109 of the panel 10 is opposite to the second end 203 of the mounting base 20. In a situation that the panel 10 is connected with the mounting base 20 in the second connection mode, the first end 108 of the panel 10 is opposite to the second end 203 of the mounting base 20, and the second end 109 of the panel 10 is opposite to the first end 202 of the mounting base 20.

Since the panel 10 may be detached and may be connected with the mounting base 20 in two modes, when the door lock device is applied to a left-handed door or a right-handed door, the mounting base 20 and the panel 10 may be separated, and then connected with each other in the first connection mode or the second connection mode, such that the handle structure 1020 faces a side of the door sheet away from the hinge.

Figure 4:
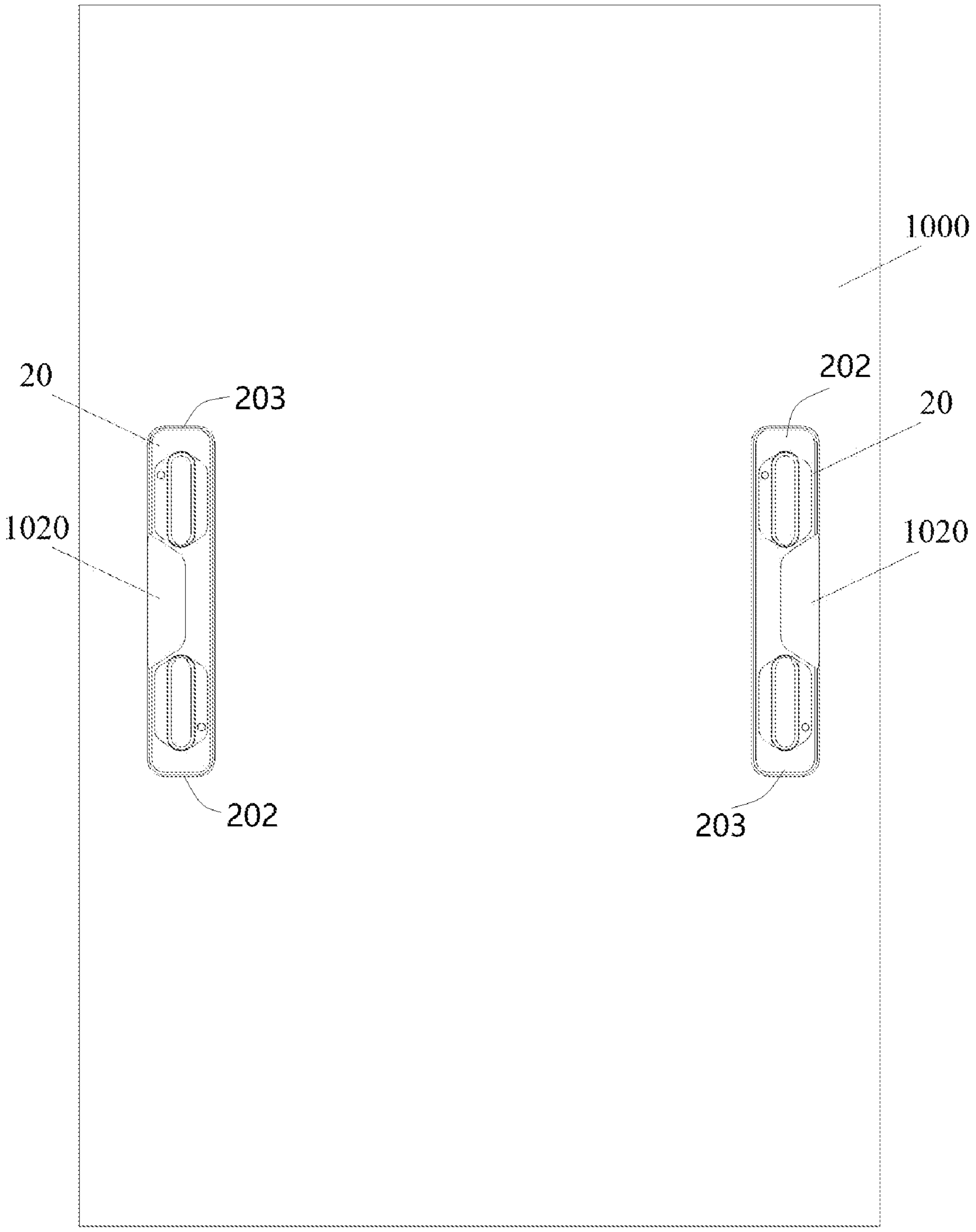
FIG. 4 is a schematic mounting diagram of a door lock device provided in an example of the disclosure.

For example, FIG. 4 is a schematic mounting diagram of a door lock device provided in an example of the disclosure. In FIG. 4, for convenience of comparison between the first connection mode and the second connection mode, two door lock devices are shown on one door sheet 1000, which does not mean that two door lock devices are mounted on one door sheet at the same time, and the panel 10 of the door lock device is omitted.

Under the situation that the door lock device is applied to a left-handed door, a left side of the door sheet is hinged to a door frame by means of a hinge, and the door lock device is close to a right side of the door sheet. With reference to the door lock device at a right side in FIG. 4, the handle structure 1020 is located on a right side of the door lock device and faces the right side of the door sheet.

Under the situation that the door lock device is applied to a right-handed door, a right side of the door sheet is hinged to a door frame by means of a hinge, and the door lock device is close to a left side of the door sheet. With reference to the door lock device at a left side in FIG. 4, the handle structure 1020 is located on a left side of the door lock device 2000 faces the left side of the door sheet.

Since the display screen 105, the keys 103, the camera 104, the loudspeaker 102 and other structures are generally arranged on the front surface of the panel 10, no matter the door lock device is mounted on a left-handed door or a right-handed door, a mounting direction of the panel 10 is fixed. For example, the first end 108 of the panel 10 is kept at a top portion, and the second end 109 of the panel 10 is kept at a bottom portion. By changing the mounting direction of the mounting base 20, for example, by making the first end 202 of the mounting base 20 at an upper portion and the second end 203 of the mounting base 20 at a lower portion, or making the second end 203 of the mounting base 20 at the upper portion and the first end 202 of the mounting base 20 at the lower portion, the door lock device matches the left-handed door or the right-handed door.

As shown in FIG. 2, the mounting base 20 has two openings 201 on the first surface close to the panel 10, and the two openings 201 are respectively located on two sides of the recess 20*a*.

Panel 10 has two protruding parts 101 on a surface close to the mounting base 20, the two protruding parts 101 are located in the two openings 201 respectively, and the two protruding parts 101 are connected with the mounting base 20.

The two protruding parts 101 of the panel 10 extend into the two openings 201 of the mounting base 20 to be connected with the mounting base 20. When the connection mode between the panel 10 and the mounting base 20 is required to be changed, the panel 10 may be detached, a direction of the panel 10 is kept unchanged, the mounting base 20 is rotated by 180 degrees, and then the two protruding parts 101 extend into the two openings 201 of the mounting base 20 to be connected with the mounting base 20.

The two openings 201 may be centrosymmetric about a point on the first surface of the mounting base 20 close to the panel 10, and the two protruding parts 101 may be centrosymmetric about a point on the surface of the panel 10 close to the mounting base 20, such that the panel 10 and the mounting base 20 may be stably connected both in the first connection mode and the second connection mode.

Figure 5:
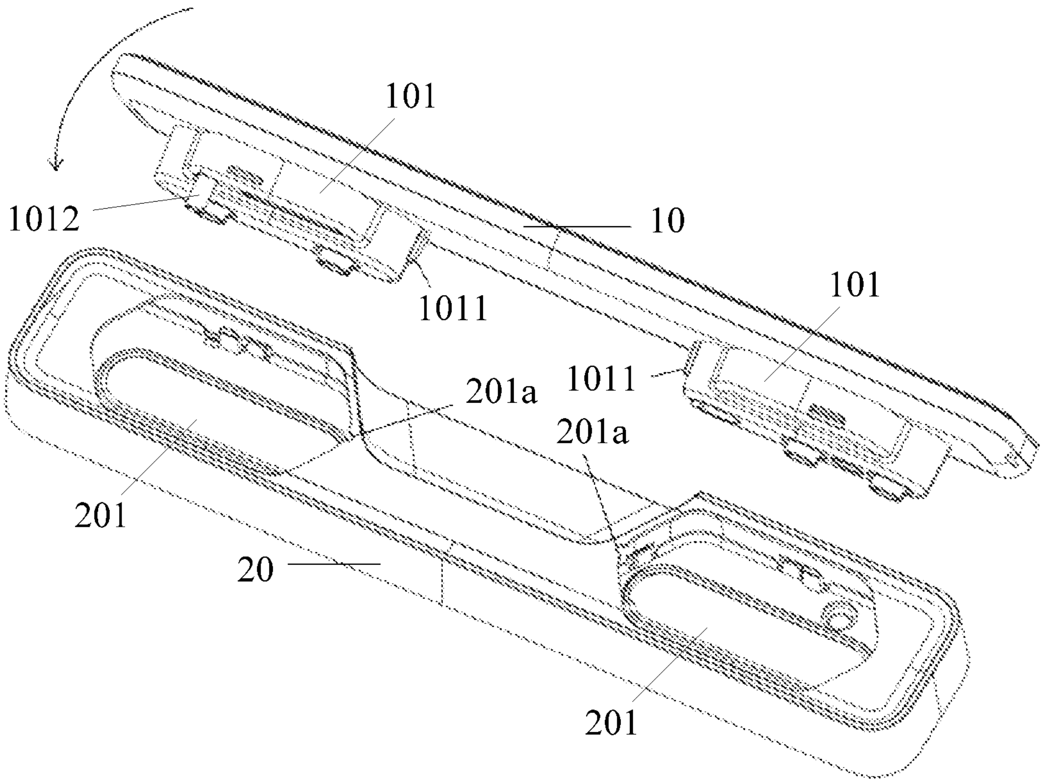
FIG. 5 is a schematic assembly diagram of a panel and a mounting base provided in an example of the disclosure.

FIG. 5 is a schematic assembly diagram of a panel and a mounting base provided in an example of the disclosure. As shown in FIG. 5, an edge of each opening 201 has a positioning notch 201*a*. A side wall of each protruding part 101 has a positioning protrusion 1011, and the positioning protrusion 1011 is located in the positioning notch 201*a*.

When the protruding parts 101 are inserted into the openings 201, the positioning protrusions 1011 are inserted into the positioning notches 201*a*, and the positioning protrusions 1011 match the positioning notches 201*a*, such that assembly precision of the panel 10 and the mounting base 20 is higher.

In other examples, an edge of each opening 201 has the positioning protrusion 1011, and a side wall of each protruding part 101 has the positioning notch 201*a*, such that the positioning protrusion 1011 matches the positioning notch 201*a*.

In an example of the disclosure, the edge of each opening 201 has at least one positioning notch 201*a*, and the positioning notches 201*a* of the two openings 201 and the two openings 201 are centrosymmetric about the same point on the first surface of the mounting base 20 close to the panel 10 respectively. Thus, after the panel 10 is detached, and the mounting base 20 is rotated by 180 degrees, when the panel 10 is mounted, the positioning protrusions 1011 on the side walls of the two protruding parts 101 may still match the positioning notches 201*a* of the two openings 201 respectively.

Figure 6:
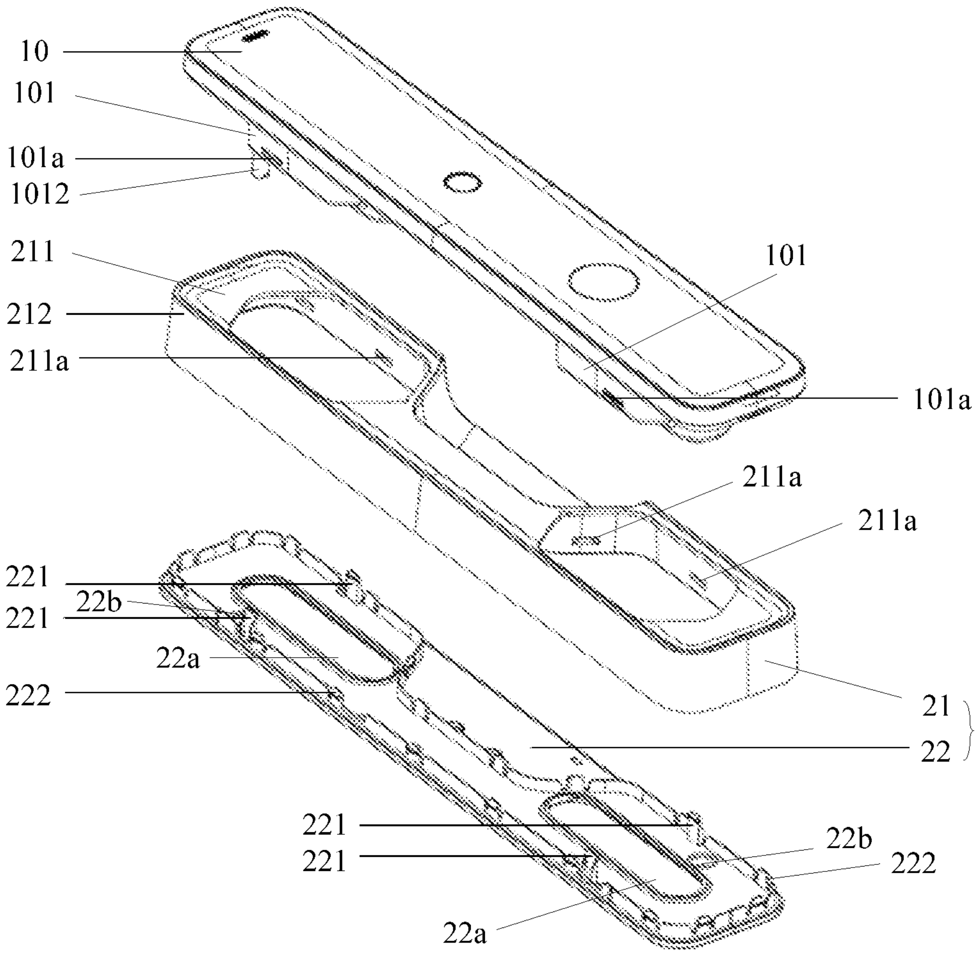
FIG. 6 is a schematic exploded view of a door lock device provided in an example of the disclosure.

FIG. 6 is a schematic exploded view of a door lock device provided in an example of the disclosure. As shown in FIG. 6, the mounting base 20 includes a bottom plate 22 and a base 21. The bottom plate 22 and the panel 10 are respectively located on two opposite sides of the base 21, the bottom plate 22 is detachably connected with the base 21, the two openings 201 are located on a surface of the base 21 close to the panel 10, and the protruding parts 101 are connected with the bottom plate 22.

The bottom plate 22 is connected with the base 21 to form the mounting base 20, and the bottom plate 22 and the base 21 may be detached, so as to facilitate disassembly and assembly of the door lock device.

As shown in FIG. 6, the base 21 includes a top plate 211 and a plurality of side plates 212. The plurality of side plates 212 are distributed along an edge of the top plate 211, and are connected with the edge of the top plate 211, and the plurality of side plates 212 are connected in sequence. The openings 201 are located on the top plate 211. The bottom plate 22 is connected with the base 21, the bottom plate 22 is opposite to the top plate 211. The bottom plate 22, the top plate 211 and the plurality of side plates 212 form a space.

As shown in FIG. 6, the bottom plate 22 is provided with wiring holes 22*a*, and the wiring holes 22*a* are opposite to the two openings 201.

In an example of the disclosure, the bottom plate 22 has two wiring holes 22*a*, and the two wiring holes 22*a* on the bottom plate 22 are opposite to the two openings 201 on the top plate 211 respectively. Wires of the display screen 105, the keys 103, the camera 104, the loudspeaker 102 and other structures arranged on the panel 10 may penetrate out of the protruding parts 101, and then extend to the outside of the mounting base 20 by means of the two wiring holes 22*a* on the bottom plate 22, so as to facilitate a connection of a circuit structure of the anti-theft door.

For example, the wiring holes 22*a* are kidney-shaped holes.

In an example of the disclosure, bottom plate 22 has a plurality of first buckles 221 on a side close to the protruding parts 101, and the plurality of first buckles 221 are in snap fit with the protruding parts 101.

As shown in FIG. 6, side walls of the protruding parts 101 have a plurality of first slots 101*a*. When the protruding parts 101 are connected with the bottom plate 22, the first buckles 221 are in snap fit with the first slots 101*a*. The plurality of first buckles 221 are also centrosymmetric about the same point on the first surface of the mounting base 20 close to the panel 10, and the plurality of first slots 101*a* are arranged corresponding to the plurality of first buckles 221, such that after the mounting base 20 is rotated by 180 degrees, the plurality of first buckles 221 may still be in snap fit with the plurality of first slots 101*a*.

For example, in an example of the disclosure, the bottom plate 22 has four first buckles 221, two first buckles 221 are located on two sides that opposite each other of one opening 201, and the other two first buckles 221 are located at two sides that opposite each other of the other opening 201. A side wall of each protruding portion 101 has two first slots 101*a* separately, and the two first slots 101*a* are located at two sides that opposite each other of the protruding portion 101.

In another possible implementation, each protruding portion 101 has a plurality of first buckles 221 on a side close to the bottom plate 22, and the first buckles 221 are in snap fit with the bottom plate 22.

In this example, the bottom plate 22 may have a plurality of first slots 101*a*. When the protruding parts 101 are connected with the bottom plate 22, the first buckles 221 of the protruding parts 101 are in snap fit with the first slots 101*a* of the bottom plate 22 such that the panel 10 may be detachably connected with the mounting base 20.

Figure 7:
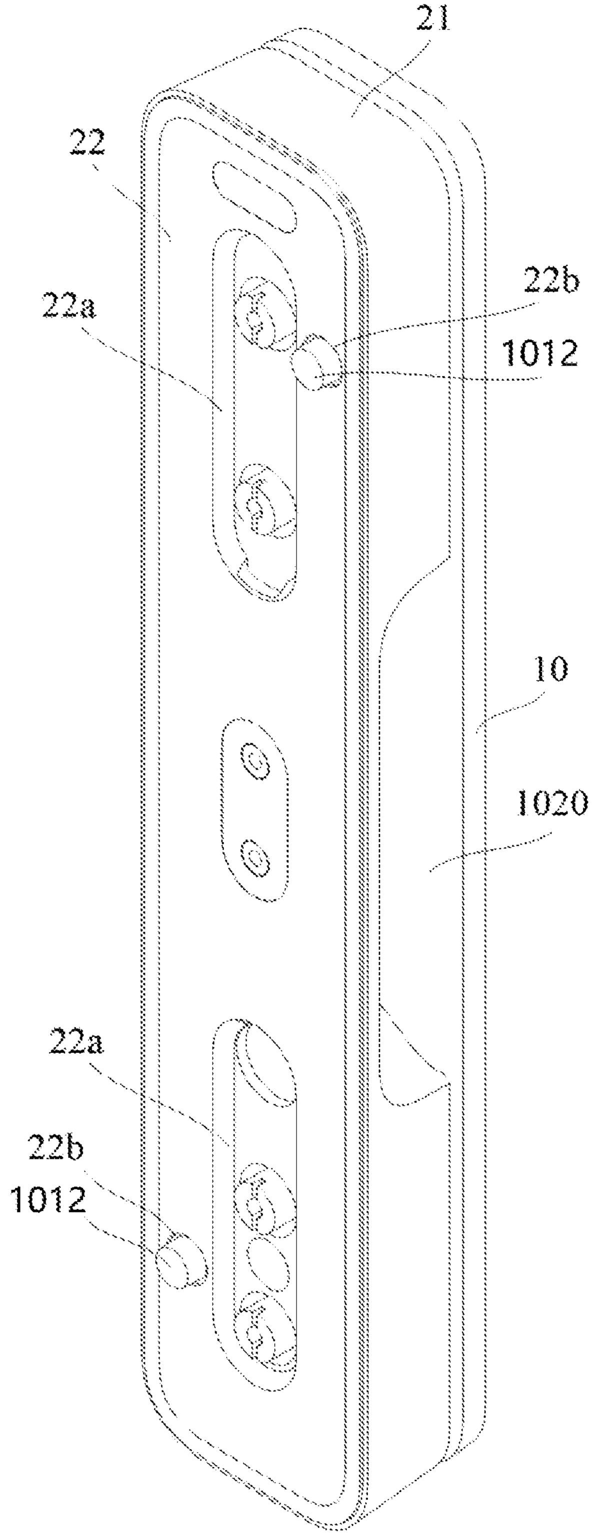
FIG. 7 is a schematic structural diagram of a door lock device provided in an example of the disclosure.

In some examples, the protruding parts 101 may have first positioning structures 1012 on surfaces close to the bottom plate 22, and the bottom plate 22 may have second positioning structures 22*b*. FIG. 7 is a schematic structural diagram of a door lock device provided in an example of the disclosure. As shown in FIG. 7, the first positioning structures 1012 match the second positioning structures 22*b*, and the first positioning structures 1012 are connected with the second positioning structures 22*b*.

Through matching between the first positioning structures 1012 and the second positioning structures 22*b*, mounting accuracy of the panel 10 and the bottom plate 22 may be improved, and the first buckles 221 may be better aligned with the first slots 101*a*.

In an example of the disclosure, the first positioning structures 1012 are positioning columns, and the second positioning structures 22*b* are positioning holes. The positioning columns of the protruding parts 101 are inserted into the positioning holes of the bottom plate 22, and the positioning columns match the positioning holes.

In other examples, the first positioning structures 1012 are positioning holes, and the second positioning structures 22*b* are positioning columns. The positioning columns of the bottom plate 22 are inserted into the positioning holes of the protruding parts 101, and the positioning columns match the positioning holes.

In an example of the disclosure, the bottom plate 22 has a plurality of second buckles 222 on a side close to the base 21, and the second buckles 222 are in snap fit with an inner wall of the base 21.

As shown in FIG. 6, inner side walls of the side plates 212 of the base 21 have a plurality of second slots 211*a*. When the bottom plate 22 is connected with the base 21, the second buckles 222 are in snap fit with the second slots 211*a*, such that the bottom plate 22 is detachably connected with the base 21.

The plurality of second buckles 222 may be distributed along the edge of the bottom plate 22, and each side plate 212 of the base 21 has at least one second slot 211*a*, so as to make a connection between the bottom plate 22 and the base 21 more stable.

In another possible implementation, the base 21 has a plurality of second buckles 222 on a side close to the bottom plate 22, and the second buckles 222 are in snap fit with the bottom plate 22.

In this example, the bottom plate 22 has a plurality of second slots 211*a*. When the bottom plate 22 is connected with the base 21, the second buckles 222 of the base 21 are in snap fit with the second slots 211*a* of the bottom plate 22, such that the bottom plate 22 may be detachably connected with the mounting base 20.

The plurality of second slots 211*a* may be distributed along an edge of the bottom plate 22, and each side plate 212 of the base 21 has at least one second buckle 222, such that a connection between the bottom plate 22 and the base 21 is more stable.

Figure 8:
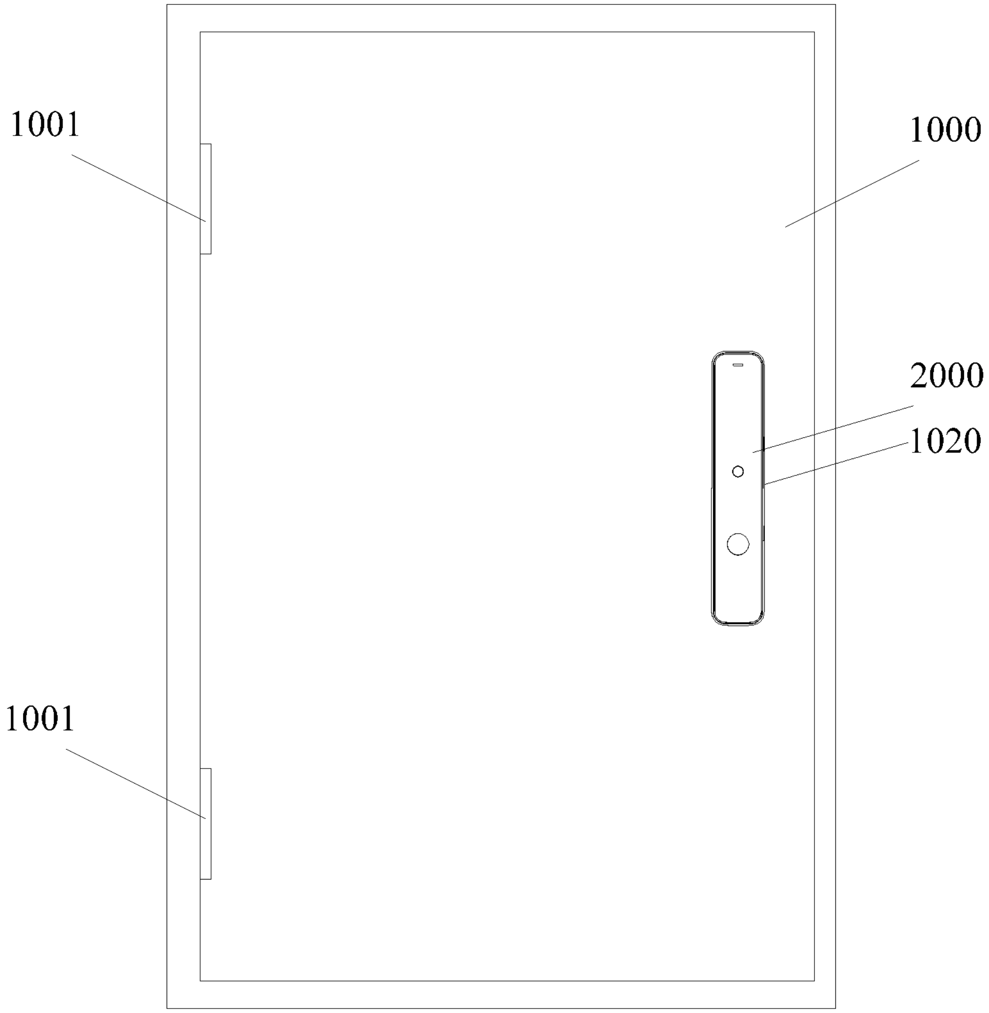
FIG. 8 is a schematic structural diagram of an anti-theft door provided in an example of the disclosure.

FIG. 8 is a schematic structural diagram of an anti-theft door provided in an example of the disclosure. As shown in FIG. 8, the anti-theft door includes a door sheet 1000 and any one of the door lock devices 2000 shown in FIGS. 2-7. One side, away from the panel 10, of the mounting base 20 of the door lock device 2000 is connected with the door sheet 1000.

The anti-theft door provided in the example of the disclosure may be a left-handed door or a right-handed door. Under the situation that the anti-theft door is a left-handed door, the door lock device 2000 is close to a right side of the door sheet 1000, and the handle structure 1020 is located on the right side of the door lock device 2000 and faces the right side of the door sheet 1000. Under the situation that the anti-theft door is a right-handed door, the door lock device 2000 is close to the left side of the door sheet 1000, and the handle structure 1020 is located on the left side of the door lock device 2000 and faces the left side of the door sheet 1000.

In the anti-theft door, the panel 10 is arranged opposite to the mounting base 20 and connected with the mounting base 20, the recess 20*a* is provided in the middle of one side of the mounting base 20 and on the surface of the mounting base 20 close to the panel 10, the recess 20*a* and the panel 10 form the handle structure 1020, and the handle structure 1020 is set for a user to push and pull the door lock device. Since the recess 20*a* is located on one side of the mounting base 20, the user may only open and close the door with a hand put into the handle structure 1020 from the side where the recess 20*a* is located, so as to guide the user to use the hand on the side where the recess 20*a* is located to operate and reduce the risk of being pinched by the anti-theft door and a door frame.

What is mentioned above is merely alternative examples of the present, but not intended to limit the disclosure, and any modifications, equivalent replacements, improvements, etc. made within the spirit and principles of the disclosure should fall within the scope of protection of the disclosure.

In some examples of the present disclosure, a door lock device may be provided. The door lock device includes a panel and a mounting base; the panel is arranged opposite to the mounting base and is connected with the mounting base; the mounting base includes a recess, the recess is located in a middle of one side of the mounting base and on a first surface of the mounting base close to the panel, the recess and the panel form a handle structure.

In some examples, the panel may be detachably connected with the mounting base, and the panel may be connected with the mounting base in a first connection mode or a second connection mode.

In some examples, the panel may have a first end and a second end in a length direction of the panel, and the mounting base may have a first end and a second end in a length direction of the mounting base; in response to determining that the panel is connected with the mounting base in the first connection mode, the first end of the panel is opposite to the first end of the mounting base, and the second end of the panel is opposite to the second end of the mounting base; and in response to determining that the panel is connected with the mounting base in the second connection mode, the first end of the panel is opposite to the second end of the mounting base, and the second end of the panel is opposite to the first end of the mounting base.

In some examples, the mounting base may include two openings on the first surface close to the panel and the two openings may be respectively located on two opposite sides of the recess.

In some examples, the panel may include two protruding parts on a surface close to the mounting base and the two protruding parts may be located in the two openings respectively and are connected with the mounting base.

In some examples, an edge of each opening may include one of a positioning notch and a positioning protrusion, a side wall of each protruding portion may include the other one of the positioning notch and the positioning protrusion, and the positioning protrusion may be located in the positioning notch.

In some examples, the mounting base may include a base and a bottom plate, the bottom plate and the panel may be respectively located on two opposite sides of the base, the bottom plate may be detachably connected with the base, the two openings may be located on a surface of the base close to the panel, and the protruding parts may be connected with the bottom plate.

In some examples, the bottom plate may have a plurality of first buckles on a side close to the protruding parts, and the first buckles may be in snap fit with the protruding parts; or, each protruding part may have a plurality of first buckles on a side close to the bottom plate, and the first buckles may be in snap fit with the bottom plate.

In some examples, the protruding parts may have first positioning structures on surfaces close to the bottom plate, the bottom plate may have second positioning structures, the first positioning structures match the second positioning structures, and the first positioning structures are connected with the second positioning structures.

In some examples, the first positioning structures may be a positioning hole and the second positioning structures may be a positioning column, or the first positioning structures may be a positioning column and the second positioning structures may be a positioning hole.

In some examples, the bottom plate may have a plurality of second buckles on a side close to the base, and the plurality of second buckles are in snap fit with an inner wall of the base; or, the base may have a plurality of second buckles on a side close to the bottom plate, and the second buckles are in snap fit with the bottom plate.

In some examples, the bottom plate may have wiring holes, and the wiring holes are opposite to the two openings.

In some examples of the present disclosure, an anti-theft door is provided. The anti-theft door may include a door sheet and the door lock device according to any examples discussed above. A surface that is away from the panel, of the mounting base of the door lock device may be connected with the door sheet.

What is claimed is:

1. A door lock device, comprising:

a mounting base comprising a recess located in a middle of one side of the mounting base and not extending through to the other side of the mounting base; and a panel that is arranged opposite to the mounting base and is detachably connected with the mounting base, wherein the recess is located on a first surface of the mounting base close to the panel, the first surface of the mounting base is located between the one side and the other side of the mounting base, and the recess and the panel form a handle structure, wherein the panel is connected with the mounting base in two connection modes, wherein:

in the first connection mode, the door lock device is applied to a left-handed door, the handle structure is located on a right side of the door lock device; and in the second connection mode, the door lock device is applied to a right-handed door, the handle structure is located on a left side of the door lock device; and wherein the panel comprises a first end and a second end in a length direction of the panel, and the mounting base comprises a first end and a second end in a length direction of the mounting base; in response to determining that the panel is connected with the mounting base in the first connection mode, the first end of the panel is opposite to the first end of the mounting base, and the second end of the panel is opposite to the second end of the mounting base; and in response to determining that the panel is connected with the mounting base in the second connection mode, the first end of the panel is opposite to the second end of the mounting base, and the second end of the panel is opposite to the first end of the mounting base.

2. The door lock device according to claim 1, wherein the mounting base comprises two openings on the first surface close to the panel, and the two openings are respectively located on two opposite sides of the recess; and wherein the panel comprises two protruding parts on a surface close to the mounting base and the two protruding parts are located in the two openings respectively and are connected with the mounting base.

3. The door lock device according to claim 2, wherein an edge of each opening comprises one of a positioning notch and a positioning protrusion, a side wall of each protruding part comprises the other one of the positioning notch and the positioning protrusion, and the positioning protrusion is located in the positioning notch.

4. The door lock device according to claim 2, wherein the mounting base comprises a base and a bottom plate, the bottom plate and the panel are respectively located on two opposite sides of the base, the bottom plate is detachably connected with the base, the two openings are located on a surface of the base close to the panel, and the protruding parts are connected with the bottom plate.

5. The door lock device according to claim 4, wherein the bottom plate comprises a plurality of first buckles on a side close to the protruding parts, and the plurality of first buckles are in snap fit with the protruding parts.

6. The door lock device according to claim 4, wherein each protruding part comprises a plurality of first buckles on a side close to the bottom plate, and the plurality of first buckles are in snap fit with the bottom plate.

7. The door lock device according to claim 4, wherein the protruding parts comprise first positioning structures on surfaces close to the bottom plate, the bottom plate comprises second positioning structures, the first positioning structures match the second positioning structures, and the first positioning structures are connected with the second positioning structures.

8. The door lock device according to claim 7, wherein one of the first positioning structures and the second positioning structures is a positioning hole, and the other one of the first positioning structures and the second positioning structures is a positioning column.

9. The door lock device according to claim 4, wherein the bottom plate comprises a plurality of second buckles on a side close to the base, and the plurality of second buckles are in snap fit with an inner wall of the base.

10. The door lock device according to claim 4, wherein the base comprises a plurality of second buckles on a side close to the bottom plate, and the second buckles are in snap fit with the bottom plate.

11. The door lock device according to claim 4, wherein the bottom plate comprises wiring holes, and the wiring holes are opposite to the two openings.

12. An anti-theft door, comprising:

a door sheet; and a door lock device comprising a panel and a mounting base, wherein the panel is arranged opposite to the mounting base and is detachably connected with the mounting base, and the mounting base comprises a recess, the recess is located in a middle of one side of the mounting base and does not extend through to the other side of the mounting base, and the recess is located on a first surface of the mounting base close to the panel, the recess and the panel form a handle structure, and the first surface of the mounting base is located between the one side and the other side of the mounting base;

wherein a second surface, away from the panel, of the mounting base of the door lock device is connected with the door sheet;

wherein the panel is connected with the mounting base in two connection modes, wherein:

in the first connection mode, the door lock device is applied to a left-handed door, the handle structure is located on a right side of the door lock device; and in the second connection mode, the door lock device is applied to a right-handed door, the handle structure is located on a left side of the door lock device; and wherein the panel comprises a first end and a second end in a length direction of the panel, and the mounting base comprises a first end and a second end in a length direction of the mounting base; in response to determining that the panel is connected with the mounting base in the first connection mode, the first end of the panel is opposite to the first end of the mounting base, and the second end of the panel is opposite to the second end of the mounting base; and in response to determining that the panel is connected with the mounting base in the second connection mode, the first end of the panel is opposite to the second end of the mounting base, and the second end of the panel is opposite to the first end of the mounting base.

13. The anti-theft door according to claim 12, wherein the mounting base comprises two openings on the first surface close to the panel, and the two openings are respectively located on two opposite sides of the recess; and wherein the panel comprises two protruding parts on a surface close to the mounting base and the two protruding parts are located in the two openings respectively and are connected with the mounting base.

14. The anti-theft door according to claim 13, wherein an edge of each opening comprises one of a positioning notch and a positioning protrusion, a side wall of each protruding part comprises the other one of the positioning notch and the positioning protrusion, and the positioning protrusion is located in the positioning notch.

15. The anti-theft door according to claim 13, wherein the mounting base comprises a base and a bottom plate, the bottom plate and the panel are respectively located on two opposite sides of the base, the bottom plate is detachably connected with the base, the two openings are located on a surface of the base close to the panel, and the protruding parts are connected with the bottom plate.

16. The anti-theft door according to claim 15, wherein the bottom plate comprises a plurality of first buckles on a side close to the protruding parts, and the plurality of first buckles are in snap fit with the protruding parts.

17. The anti-theft door according to claim 15, wherein the protruding parts comprise first positioning structures on surfaces close to the bottom plate, the bottom plate comprises second positioning structures, the first positioning structures match the second positioning structures, and the first positioning structures are connected with the second positioning structures.

18. The anti-theft door according to claim 15, wherein the bottom plate comprises a plurality of second buckles on a side close to the base, and the plurality of second buckles are in snap fit with an inner wall of the base.

* * * * *